Oct. 16, 1962  J. T. BANKOWSKI  3,058,760
PIPE COUPLING HAVING RADIALLY EXPANSIBLE GRIPPING MEANS
Filed June 23, 1959
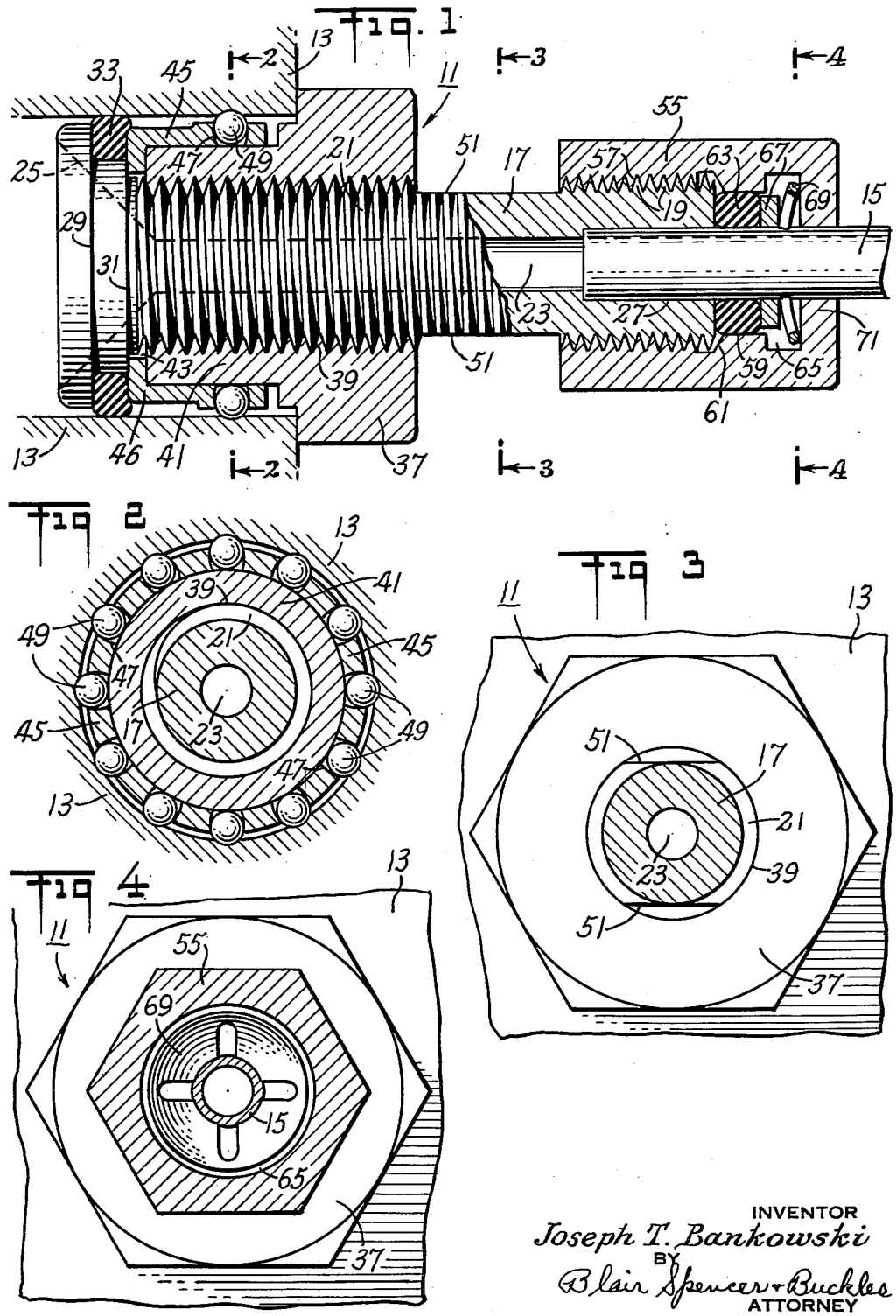
INVENTOR
Joseph T. Bankowski
BY
Blair Spencer + Buckles
ATTORNEY United States Patent Office
3,058,760
Patented Oct. 16, 1962

3,058,760
PIPE COUPLING HAVING RADIALLY EXPANSIBLE GRIPPING MEANS
Joseph T. Bankowski, 144 Jefferson St., Stamford, Conn.
Filed June 23, 1959, Ser. No. 822,220
4 Claims. (Cl. 285—196)

This invention relates to couplings and more particularly to couplings of the quick engageable and detachable type.

Most couplings in the prior art are provided with threads, which necessitate tapping the members to be connected or other expensive tool operations, in order to effect sealed or leak-proof connections. When proceeding according to my invention, the need for tapping is eliminated. The device according to my invention is easily attached to the members to be connected and requires very little skill to effect the desired coupling.

In some prior art couplings, particularly those which take the form of T's, elbows and the like, proper alignment of the couplings with the members to be connected, is usually effected by over or under tightening the couplings to one or both of the members. This over or under tightening usually results in faulty connections, which must be soldered or otherwise packed with metal and the like to prevent leakage. When the couplings of the prior art are properly tightened, they are usually in misalignment with the members to be joined. My device in the form of T's, elbows and the like may be fastened to the members to be connected easily and effectively without incurring alignment problems.

An object of my invention is to provide an improved device for coupling purposes, which device may be easily engaged and detached.

Another object of my invention is to provide coupling means for use in joining pipes, rods or the like without the need for tapping, threading or soldering the members to be connected.

Another object of my invention is to provide coupling means for use in joining pipes, rods or the like, which device in the form of elbows, T's and the like may be easily engaged and positioned without incurring alignment difficulties.

Still another object of my invention is to provide a coupling device, which may be securely fastened to the members to be connected without the transmission of appreciable amounts of torque to the members during attachment.

Other objects of the invention will be in part obvious and will in part appear hereinafter.

The invention accordingly comprises an article of manufacture possessing the features, properties and the relation of elements which will be exemplified in the article hereinafter described, and the scope of the invention will be indicated in the claims.

For a fuller understanding of the nature and objects of the invention, reference should be had to the following detailed description taken in connection with the accompanying drawing in which like reference numerals designate like or corresponding parts throughout the several views and in which:

FIGURE 1 is a longitudinal sectional view of my improved coupling device;

FIGURE 2 is a cross section taken on line 2—2 of FIGURE 1;

FIGURE 3 is a cross section taken on line 3—3 of FIGURE 1, and;

FIGURE 4 is a cross section taken on line 4—4 of FIGURE 1.

Referring now to FIGURE 1, there is shown a coupling device, generally indicated at 11, connecting a pipe or vessel 13 to a pipe or vessel 15. The coupling device comprises a body portion 17, threaded as shown at 19 and 21. A central bore 23 extends through the center of the body portion 17, which bore may terminate in a conical passageway 25 at one end and an annular passageway 27 at the other end. The body portion 17 is preferably provided with a plurality of annular shoulder portions 29 and 31 at one end thereof. An O-ring 33, made of resilient material such as for example, rubber, plastic and the like, rests on the shoulder portion 29. A load nut 37 is provided with internal threads 39 which threadably engage the threads 21 on body portion 17. The load nut 37 is provided with a portion 41, which may be tapered. It is arranged so that when the nut is fully threaded an undercut groove 43 is formed between the shoulder 31 and the load nut 37, for holding a retainer 45 which preferably includes a disc portion, 46. The retainer 45 or the retainer disc portion 46, as the case may be, together with the shoulder 29 act to deform the O-ring 33 to form a fluid-tight seal with the member 13 when the load nut 37 is fully engaged. The retainer 45 is provided with a plurality of openings 47 which maintain gripping elements, such as steel balls 49 or the like in spaced relationship as clearly shown in FIGURE 2. The nut 37 is preferably larger than the hole in the vessel or pipe 13, so that when the coupling is inserted into the vessel, it cannot fall into the vessel.

Referring now to FIGURE 3, the body portion 17 is preferably provided with a plurality of flats 51 which extend down to the threaded portion 21. The flats 51 are provided on the body portion 17, so that the coupling may be held stationary and attached to the members to be connected without transmitting appreciable amounts of torque thereto.

Referring once again to FIGURE 1, there is shown the remainder of the coupling device 11. While this portion may be the same as the structure previously described, it may take the form now to be described. This alternate form is preferred when the coupling device is connected to a pipe of small crosssectional area, thereby preventing undue restriction of the orifice therethrough. A nut 55 is provided with threads 57 which are arranged to engage threads 19 on the body portion 17. An annular passageway 59 is provided in the nut 55, and is preferably joined to the threaded portion 57 by a bevelled portion 61. An O-ring 63 fits into the annular passageway 59 and when deformed effects a fluid tight seal with the pipe 15. A second annular passageway 65 is preferably provided in the nut 55, to house a pressure transmitting element such as disc 67, of suitable material such as metal, plastic and the like, and a spring washer 69. The nut 55 extends beyond the spring washer 69 and terminates in a portion 71 against which the spring washer 69 makes contact. The general arrangement of the elements is clearly shown in FIGURE 4 which is a cross sectional view taken through the washer 69.

Having described the arrangement of parts, a brief description of the attachment of the device shown, is in order. With the load nut 37 backed off so that it clears the balls 49, the device 11 is inserted into an untapped bore in the vessel 13, with the O-ring 33 resting on the shoulder portion 29 and the retainer disc portion 46 resting on the O-ring 33. The body portion 17 is held at the flats 51 by a suitable tool such as an open end wrench or the like and the load nut 37 is tightened so that it abuts against the retainer disc portion 46 as shown in FIGURE 1. As the load nut 37 is tightened and moves past the gripping elements or balls 49, it forces them outwardly and causes them to indent or Brinell the member 13, thus securing the coupling firmly in place. When the load nut 37 approaches the end of its travel, the body portion 17 moves relative to the retainer disc portion 46 compressing the O-ring 33 and thus effecting a seal between the vessel 13 and the coupling. With the device 11 secured to the vessel in the above manner, connection is then made to the other vessel or pipe in a similar manner. If it is desirous to effect connection to the exterior of a vessel or pipe 15 as shown in FIGURE 1, the pipe 15 is inserted into the body portion 17 as shown. The O-ring 63 is then placed around the pipe 15 and against the end of the body portion 17. The nut 55, together with the disc 67 and the spring washer 69 assembled in place is then threadably engaged with the body portion 17 while the body portion is held against movement by a suitable wrench or the like. As the nut 55 is tightened, the spring washer 69 transmits sufficient force, through disc 67, to deform the O-ring 63. As the spring washer 69 deforms it bites into and grips the pipe 15. The coupling device shown thus effects a fluid-tight seal between the vessels or the members to be connected and is rigidly held thereto in the manner shown.

It will thus be seen that the objects set forth above, among those made apparent from the preceding description are efficiently attained and, since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A coupling device for connection to an untapped cylindrically walled member comprising in combination, a body member provided with threads and a shoulder portion at the forward end thereof, a retainer having a cylindrical portion and an inwardly extending flange portion, a plurality of gripping elements mounted in and extending through said cylindrical portion, a nut threadedly engaging said body member having a forward portion adapted to extend into said cylindrical portion of the retainer for contacting and radially displacing said gripping elements, said flange portion mounted between said shoulder portion and said nut, annular resilient sealing means mounted between said flange portion and said shoulder portion, said cylindrical portion of said retainer located between the forward portion of said nut and the cylindrically walled member and said cylindrical portion movable relative to said body member so as to effect deformation of said resilient sealing means, means on said cylindrical portion of said retainer for allowing radial movement of said gripping elements, said gripping elements being displaced radially to the axis of said body member from an initial position inside the untapped member into gripping engagement with the wall of the untapped member as the forward portion of said nut engages the gripping elements, said annular sealing means being deformed when said nut is abutted against said flange portion so as to compress said resilient sealing means between said shoulder, said flange and the untapped cylindrically walled member when in the assembled position.

2. The coupling device of claim 1 further defined in that said gripping elements are ball-like elements.

3. The device of claim 1 further defined in that the forward portion of said nut is tapered.

4. A coupling device for connection to an untapped cylindrically walled member comprising in combination, a body member provided with threads and a shoulder portion at the forward end thereof, a retainer having a cylindrical portion and an inwardly extending flange portion, a nut threadedly engaging said body member having a forward portion adapted to extend into the cylindrical portion of said retainer, a plurality of gripping elements mounted in and extending through said cylindrical portion, cam means on one of said forward portion of the nut and the plurality of gripping elements, said flange portion mounted between said shoulder portion and said nut, annular resilient sealing means mounted between said flange portion and said shoulder portion, said cylindrical portion of said retainer located between the forward portion of said nut and the cylindrically walled member and said cylindrical portion movable relative to said body member so as to effect deformation of said resilient sealing means, means on said cylindrical portion of said retainer for allowing radial movement of said gripping elements, said gripping elements being displaced radially to the axis of said body member from an initial position inside the untapped member into gripping engagement with the wall of the untapped member so that the device is secured to the untapped member as the forward portion of said nut engages the gripping elements, said annular sealing means being deformed when said nut is abutted against said flange portion so as to compress said resilient sealing means between said shoulder, said flange and the untapped cylindrically walled member when in the assembled position.

References Cited in the file of this patent

UNITED STATES PATENTS

| | | |
|---|---|---|
| 410,848 | McHugh | Sept. 10, 1889 |
| 546,953 | Davis | Sept. 24, 1895 |
| 616,808 | Ricketts | Dec. 27, 1898 |
| 708,942 | Torchiani | Sept. 9, 1902 |
| 850,410 | Weatherhead | Apr. 16, 1907 |
| 1,440,207 | Burns | Dec. 26, 1922 |
| 1,474,437 | McWane | Nov. 20, 1923 |
| 1,781,581 | Hellyer | Nov. 11, 1930 |
| 1,857,005 | Schotthoefer | May 3, 1932 |
| 1,970,624 | Recker | Aug. 21, 1934 |
| 2,247,032 | Norton | June 24, 1941 |
| 2,264,480 | Owen | Dec. 2, 1941 |
| 2,358,408 | McMurray | Sept. 19, 1944 |
| 2,452,278 | Woodling | Oct. 26, 1948 |
| 2,467,312 | Jack | Apr. 12, 1949 |
| 2,658,777 | Rauglas | Nov. 10, 1953 |
| 2,683,499 | De Croes | July 13, 1954 |
| 2,702,202 | Kaiser | Feb. 15, 1955 |
| 2,747,899 | Wiltse | May 29, 1956 |
| 2,749,154 | Smith | June 5, 1956 |
| 2,793,056 | Graff | May 21, 1957 |

FOREIGN PATENTS

| | | |
|---|---|---|
| 201,409 | Germany | Sept. 15, 1908 |
| 732,901 | France | June 27, 1932 |
| 1,008,020 | France | Feb. 13, 1952 |